United States Patent
Sobhana

(10) Patent No.: US 10,865,634 B2
(45) Date of Patent: Dec. 15, 2020

(54) NOISE ROBUST ALGORITHM FOR MEASURING GRAVITATIONAL TOOL-FACE

(71) Applicant: Halliburton Energy Services, Inc., Houston, TX (US)

(72) Inventor: Rashobh Rajan Sobhana, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/348,545

(22) PCT Filed: Nov. 29, 2018

(86) PCT No.: PCT/US2018/062986
§ 371 (c)(1),
(2) Date: May 9, 2019

(87) PCT Pub. No.: WO2019/118185
PCT Pub. Date: Jun. 20, 2019

(65) Prior Publication Data
US 2020/0300078 A1 Sep. 24, 2020

Related U.S. Application Data

(60) Provisional application No. 62/598,932, filed on Dec. 14, 2017.

(51) Int. Cl.
*E21B 47/022* (2012.01)
*E21B 47/024* (2006.01)
(Continued)

(52) U.S. Cl.
CPC .......... *E21B 47/024* (2013.01); *E21B 47/022* (2013.01); *E21B 47/09* (2013.01); *G01C 21/165* (2013.01)

(58) Field of Classification Search
CPC .............................. E21B 47/02; E21B 47/022
See application file for complete search history.

(56) References Cited

U.S. PATENT DOCUMENTS

| 4,013,945 A | 3/1977 | Grosso |
| 4,813,274 A | 3/1989 | DiPersio et al. |
| | (Continued) | |

FOREIGN PATENT DOCUMENTS

WO 2003089759 10/2003

OTHER PUBLICATIONS

ISRWO International Search Report and Written Opinion for PCT/US2018/062986 dated Mar. 11, 2019.
(Continued)

*Primary Examiner* — Giovanna Wright
(74) *Attorney, Agent, or Firm* — Scott Richardson; C. Tumey Law Group PLLC

(57) ABSTRACT

A method may comprise penetrating a subterranean formation with a bottom hole assembly, determining a revolutions-per-minute (RPM) measurement based on a zero crossing of sinusoidal magnetometer data, determining a gyroscope bias from gyroscope data using the determined RPM measurement, determining bias compensated gyroscope data by subtracting the determined gyroscope bias from the gyroscope data, determining an angular displacement measurement using the bias compensated gyroscope data, determining a selected tool-face measurement, computing a weighted sum of the selected tool-face measurement with the determined bias compensated gyroscope data, and determining a gravitational tool-face measurement from the computed weighted sum. A system may comprise a drilling rig, a pipe string attached to the drilling rig, a bottom hole assembly attached to the pipe string, wherein the bottom hole assem-
(Continued)

bly comprises at least one sensor, a drill bit, and a computing subsystem connected to the at least one sensor.

19 Claims, 10 Drawing Sheets

(51) Int. Cl.
*G01C 21/16* (2006.01)
*E21B 47/09* (2012.01)

(56) References Cited

U.S. PATENT DOCUMENTS

| | | |
|---|---|---|
| 6,529,834 B1 | 3/2003 | Estes et al. |
| 2002/0133958 A1 | 9/2002 | Noureldin et al. |
| 2005/0154532 A1* | 7/2005 | Close .................... E21B 47/022 702/6 |
| 2005/0268476 A1 | 12/2005 | Illfelder |
| 2013/0151158 A1* | 6/2013 | Brooks ................. E21B 47/022 702/9 |
| 2014/0367170 A1* | 12/2014 | Hoehn ...................... E21B 7/04 175/45 |
| 2015/0029093 A1* | 1/2015 | Feinstein ............ E21B 17/1078 345/156 |
| 2015/0330210 A1 | 11/2015 | Lozinsky |
| 2016/0145997 A1* | 5/2016 | Van Steenwyk ...... E21B 47/022 33/302 |
| 2018/0094516 A1* | 4/2018 | Mauldin ............... E21B 47/022 |

OTHER PUBLICATIONS

Junichi Suglura, et al., Improved Continuous Azimuth and inclination Measurement by Use of a Rotary-Steerable System Enhances Downhole-Steering Automation and kickoff Capabilities Near Vertical, SPE Drilling & Completion, 29(02), 226-235. Jun. 2014.

* cited by examiner

NOISE ROBUST ALGORITHM FOR MEASURING GRAVITATIONAL TOOL-FACE

TECHNICAL FIELD

The present description relates generally to directional drilling, and more particularly to, for example, without limitation, methods using inertial and position sensors to obtain the location and direction of a bottom hole assembly in a formation.

BACKGROUND

A combination of gravity, magnetic field and, sometimes, angular sensors may be used to obtain the location and direction of a wellbore. While gravity sensors or accelerometers provide inclination and gravity tool-face (TF), magnetometers, in conjunction with the accelerometers, help to obtain azimuth or direction of the well bore. Angular sensors such as Gyroscopes may also be used to measure the angular displacement and hence the RPM. During drilling, various mechanical noise sources occur which may induce error into position surveys while a drill bit is rotating. This may translate to steering errors such that multiple static surveys may have to be performed in order to correct direction. These static surveys and corrections decrease efficiency of the drilling operation.

Figure 1A:
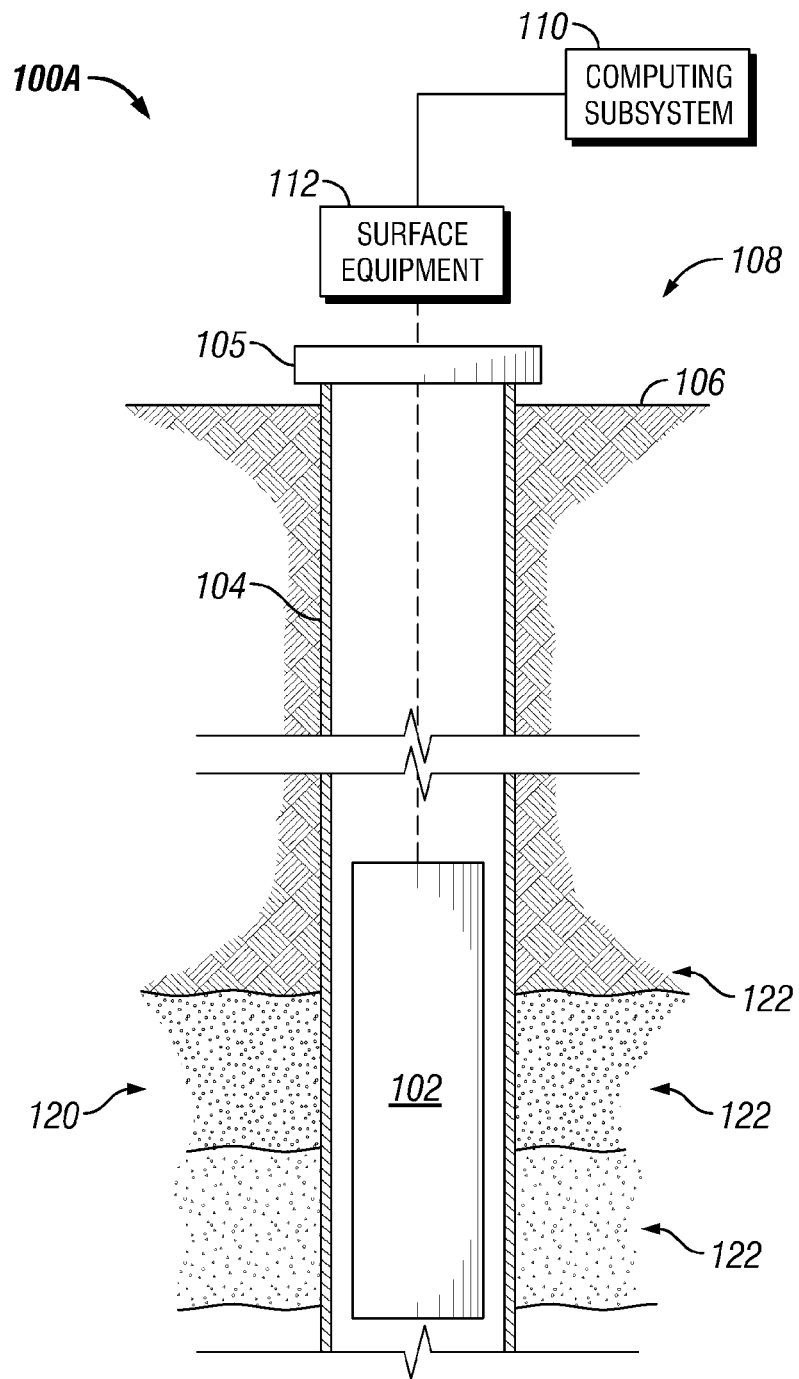
FIG. 1A is a diagram of an example well system, in accordance with aspects of the subject disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

In directional drilling, inertial and position sensors are vital components for the service to be effective. A combination of gravity, magnetic field and, sometimes, angular sensors are used to obtain the location and direction of a wellbore. While gravity sensors or accelerometers provide inclination and gravity tool-face (TF), magnetometers, in conjunction with the accelerometers, help to obtain azimuth or direction of the well bore. Angular sensors such as gyroscopes may also be used to measure the angular displacement and hence the revolutions-per-minute (RPM) measurement.

During drilling, various mechanical noise sources are at play such that position surveys have increased error while the bit is rotating. This translates to steering errors such that multiple static surveys may have to be performed in order to correct direction. These static surveys and corrections decrease efficiency of the drilling operation.

Mechanical noises such as vibration affect the performance of these sensors, especially accelerometers, which are sensitive to movement. Downhole vibrational noise as well as torsional effects may easily drown out gravitational acceleration. As opposed to the accelerometers, gyroscopes are less sensitive to lateral vibrations and movements. It may also be noted that, although magnetometers are susceptible to downhole magnetic interferences, their response is less affected by vibrational noise. One technique to mitigate the noise effects is to use filtering techniques. In example, such as direction control, real-time TF measurement is required, where filter delays may be undesirable. Computationally complex diagnosing techniques may not also not suited for real-time TF measurement applications.

Current technology may suffer from bias error due to measurements of a gyroscope. Hence, gyroscope measurement with no bias correction is not suitable for TF estimation as the bias drift hinders the estimation accuracy over a period of time. One approach to address this problem, as widely used in navigation applications, is to apply data fusion techniques such as complementary filtering (e.g., Kalman filtering). However, data fusion techniques with accelerometer data as the reference data may still yield erroneous results in the presence of downhole vibration noise.

The present disclosure provides for the estimation of instantaneous TF using data from at least three sensors, e.g., accelerometer, gyroscope, and magnetometer. The subject technology relies on a data selection criterion for the computation of TF. Depending on the data quality, the instantaneous TF may be computed using accelerometer data, gyroscope data, magnetometer data, or data fusion using complementary filtering.

The subject technology allows better position control while drilling and minimizes the need for frequent static survey, thereby increasing operational efficiency. The subject technology provides advantages over traditional gravitational TF measurement systems including, but not limited to, the subject technology 1) does not fully rely on accelerometer data, 2) may fuse information obtained from accelerometers, gyroscopes, and magnetometers, 3) the estimation may be performed with relatively good accuracy even in the presence of vibrational noise, 4) is robust to moderate levels of torsional resonance, and 5) no computational complexity hence the subject technology can be used for real-time TF estimation.

FIG. 1A is a diagram of an example well system 100a. Well system 100a includes measurement system 108 and a subterranean region 120 beneath the ground surface 106. A well system may include additional or different features that are not shown in FIG. 1A. For example, well system 100a may include additional drilling system components, wireline measurement system components, etc.

Subterranean region 120 may include all or part of one or more subterranean formations or zones. The example subterranean region 120 shown in FIG. 1A includes multiple subsurface layers 122 and a wellbore 104 penetrated through subsurface layers 122. Subsurface layers 122 may include sedimentary layers, rock layers, sand layers, or combinations of these and other types of subsurface layers. One or more of the subsurface layers may contain fluids, such as brine, oil, gas, etc. Although the example wellbore 104 shown in FIG. 1A is a vertical wellbore, measurement system 108 may be implemented in other wellbore orientations. For example, measurement system 108 may be adapted for horizontal wellbores, slanted wellbores, curved wellbores, vertical wellbores, or combinations of these.

The example measurement system 108 includes a measurement tool 102, surface equipment 112, and a computing subsystem 110. In the example shown in FIG. 1A, measurement tool 102 may be a downhole measurement tool that operates while disposed in wellbore 104. The example surface equipment 112 shown in FIG. 1A operates at or above surface 106, for example, near well head 105, to control measurement tool 102 and possibly other downhole equipment or other components of well system 100. The example computing subsystem 110 may receive and analyze measurement data from measurement tool 102. A measurement system may include additional or different features, and the features of a measurement system may be arranged and operated as represented in FIG. 1A or in another manner. In some instances, all or part of computing subsystem 110 may be implemented as a component of, or can be integrated with one or more components of, surface equipment 112, measurement tool 102 or both. In some cases, computing subsystem 110 may be implemented as one or more computing structures separate from surface equipment 112 and measurement tool 102.

In some implementations, computing subsystem 110 may be embedded in measurement tool 102, and computing subsystem 110 and measurement tool 102 may operate concurrently while disposed in wellbore 104. For example, although computing subsystem 110 is shown above surface 106 in the example shown in FIG. 1A, all or part of computing subsystem 110 may reside below surface 106, for example, at or near the location of the measurement tool 102.

Well system 100a can include communication or telemetry equipment that allows communication among computing subsystem 110, measurement tool 102, and other components of measurement system 108. For example, the components of measurement system 108 may each include one or more transceivers or similar apparatus for wired or wireless data communication among the various components. For example, measurement system 108 may include systems and apparatus for optical telemetry, wireline telemetry, wired pipe telemetry, mud pulse telemetry, acoustic telemetry, electromagnetic telemetry, or a combination of these and other types of telemetry. In some cases, measurement tool 102 receives commands, status signals, or other types of information from computing subsystem 110 or another source. In some cases, computing subsystem 110 receives measurement data, status signals, or other types of information from the measurement tool 102 or another source.

Measurement operations may be performed in connection with various types of downhole operations at various stages in the lifetime of a well system. Structural attributes and components of surface equipment 112 and measurement tool 102 may be adapted for various types of measurement operations. For example, measurement may be performed during drilling operations, during wireline measurement operations, or in other contexts. As such, surface equipment 112 and measurement tool 102 may include, or may operate in connection with drilling equipment, wireline measurement equipment, or other equipment for other types of operations.

Figure 1B:
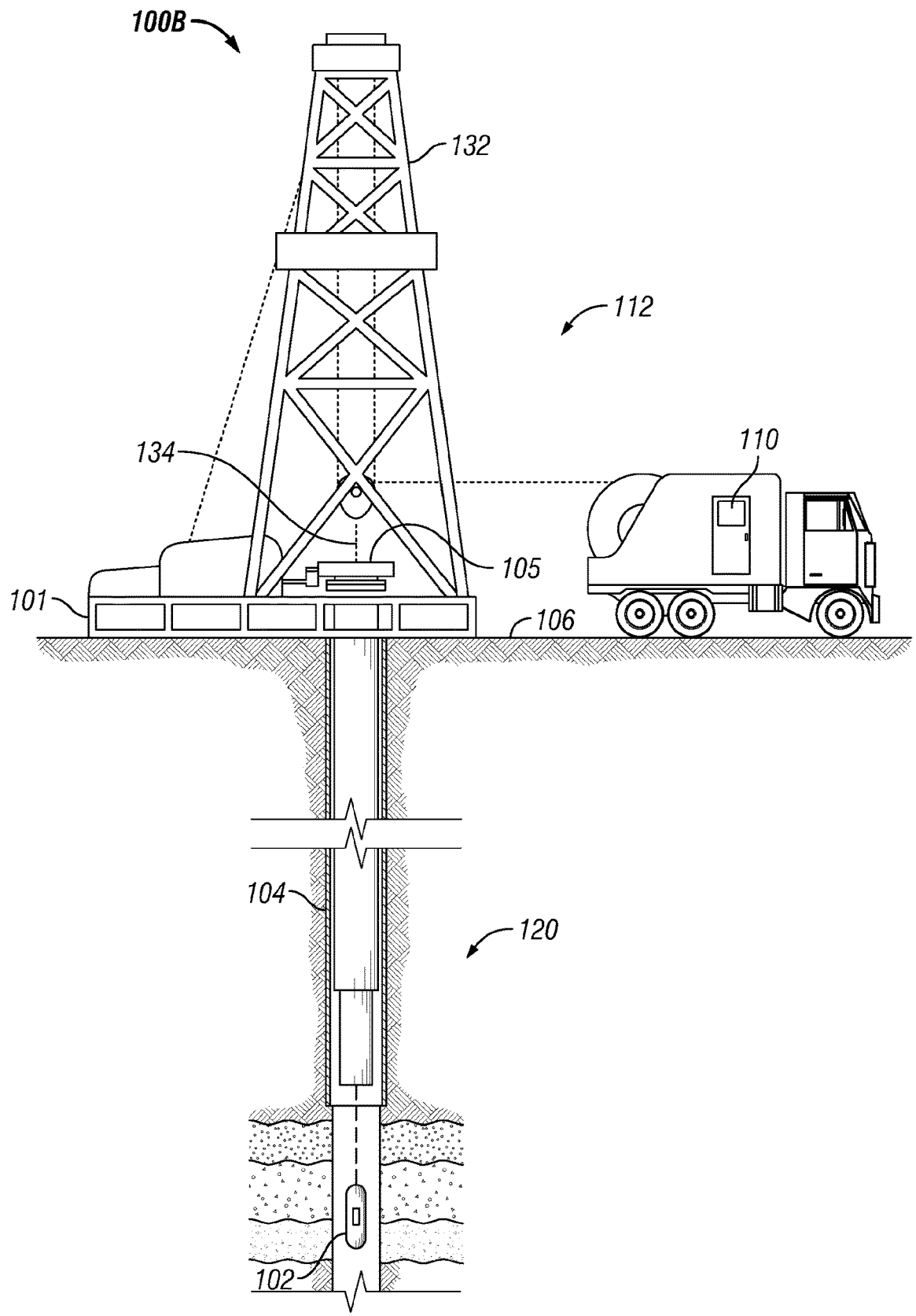
FIG. 1B is a diagram of an example well system that includes a measurement tool in a wireline measurement environment, in accordance with aspects of the subject disclosure.

In some examples, measurement operations may be performed during wireline measurement operations. FIG. 1B shows an example well system 100b that includes measurement tool 102 in a wireline measurement environment. In some example wireline measurement operations, surface equipment 112 includes a platform above surface 106 equipped with a derrick 132 that supports a wireline cable 134 that extends into wellbore 104. Wireline measurement operations may be performed, for example, after a drill string is removed from wellbore 104, to allow wireline measurement tool 102 to be lowered by wireline or measurement cable into wellbore 104.

Figure 1C:
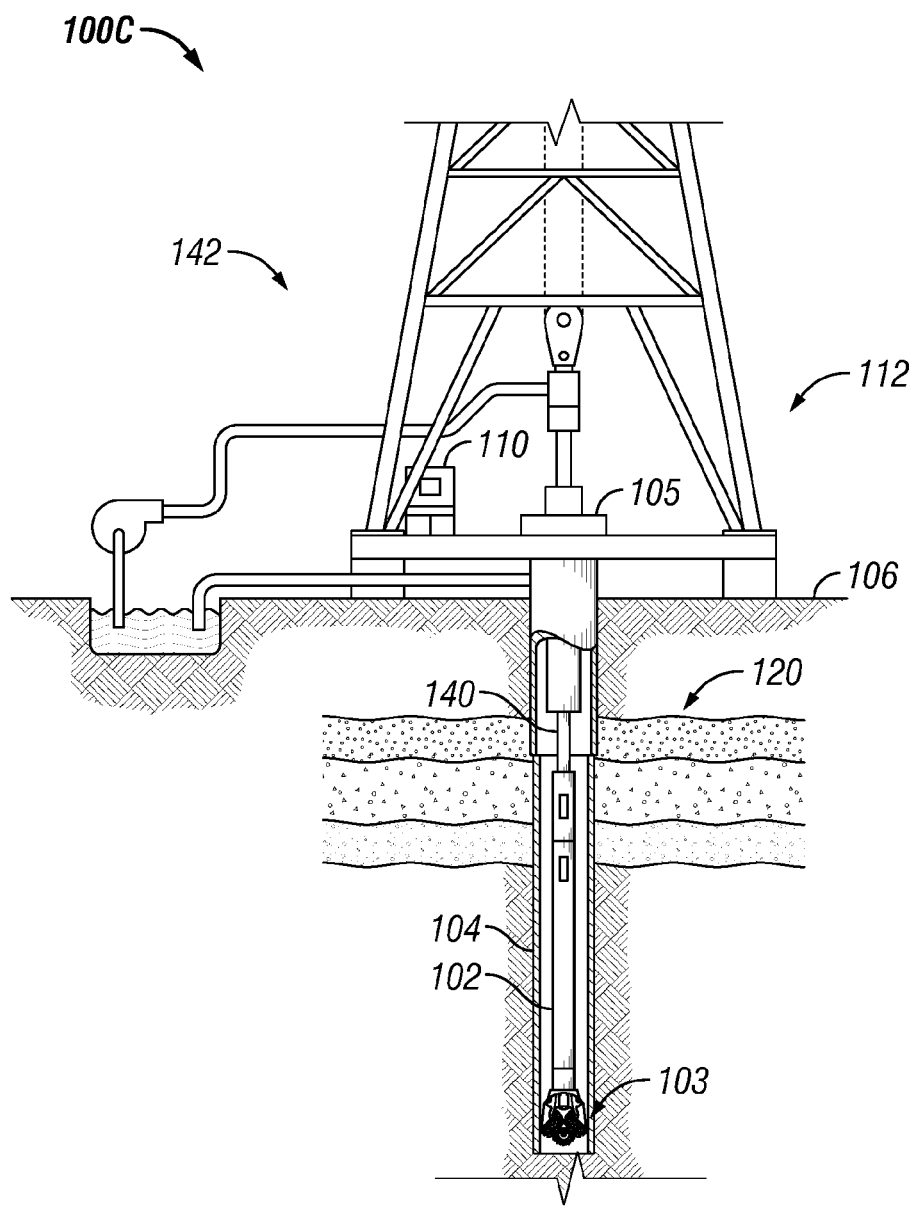
FIG. 1C is a diagram of an example well system that includes a measurement tool in a measurement while drilling (MWD) environment, in accordance with aspects of the subject disclosure.

In some examples, measurement operations may be performed during drilling operations. FIG. 1C shows an example well system 100c that includes measurement tool 102 in a measurement while drilling (MWD) environment. Drilling is commonly carried out using a string of drill pipes connected together to form a drill string 140 that is lowered through a rotary table into wellbore 104. In some cases, a drilling rig 142 at surface 106 supports drill string 140, as drill string 140 may operate to drill a wellbore penetrating subterranean region 120. Drill string 140 may include, for example, a kelly, drill pipe, a bottomhole assembly 103, a drill bit, and other components. The bottomhole assembly on the drill string may include drill collars, drill bits, measurement tool 102, and other components. The measurement tools may include measuring while drilling (MWD) tools, logging while drilling (LWD) tools, and others. In examples, measurement tool 102 may include one or more accelerometers, magnetometers, gyroscopes, angular sensors, and/or other sensors.

Figure 2:
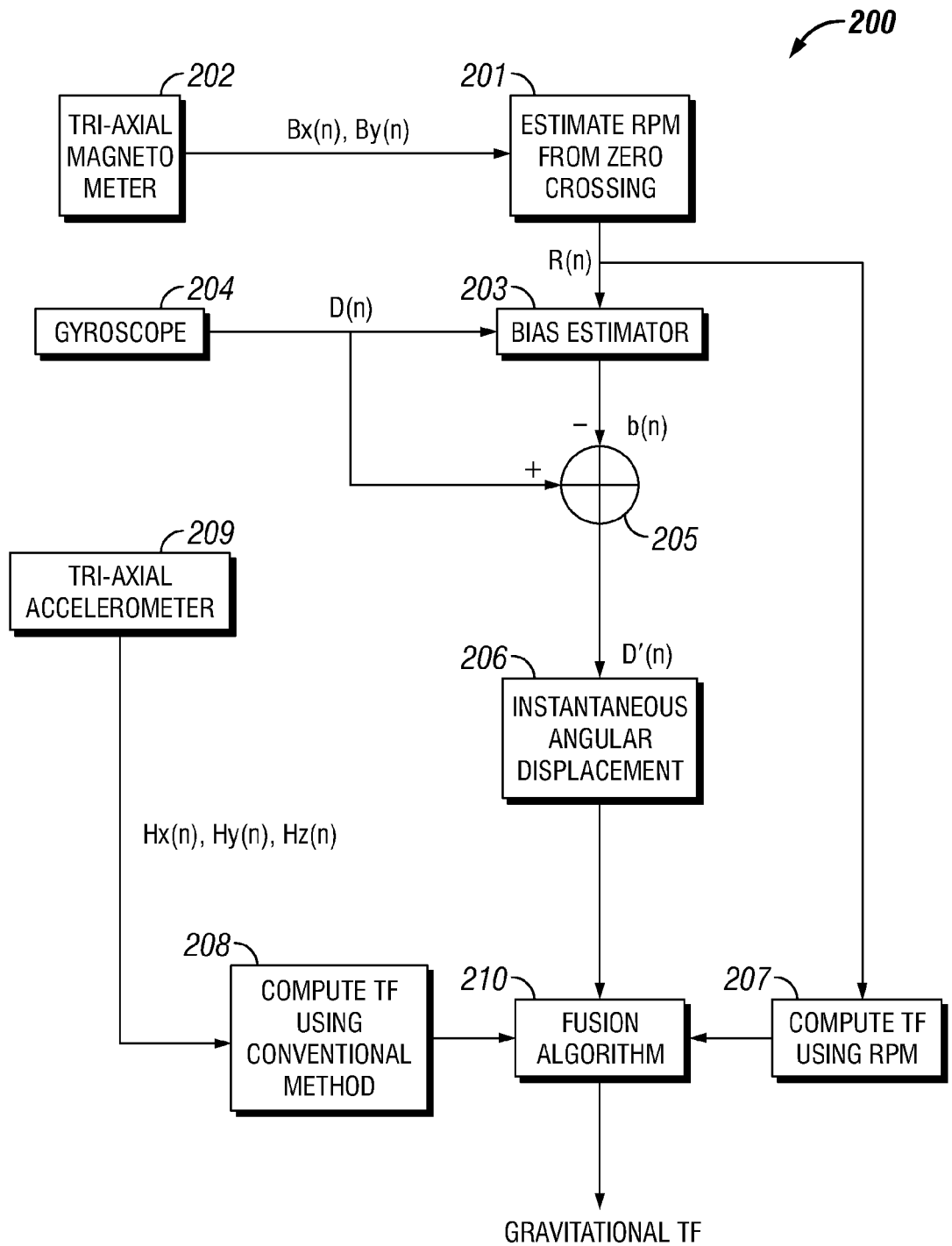
FIG. 2 is a flowchart of illustrative operations that may be performed to determine location and direction of a bottom hole assembly in a formation, in accordance with aspects of the subject disclosure.

FIG. 2 shows illustrative operations 200 that may be performed (e.g., by measurement system 108) for measuring gravitation tool-face (e.g., while drilling). At block 201, the RPM from zero crossing may be estimated. The RPM is estimated from both X-axis (e.g., Bx(n)), and Y-axis (e.g., By(n)) magnetometer data, independently, where n is the sample index. The RPM is computed based on the zero crossing of the sinusoidal magnetometer data, i.e., based on the time to rotate by 360 degrees (one cycle). Since RPM is computed from both X and Y axis data, effectively, RPM is computed for each 180 degree rotation. The X and Y axis data (e.g., Bx(n), By(n)) is obtained from a tri-axial magnetometer (202).

At block 203, initial gyroscope bias estimation is done during the stationary survey prior to rotation. While the drilling tool is rotating the gyroscope bias, b'(n), is estimated from N gyroscope data samples during the RPM information as:

$$b'(n) = \frac{1}{N} \sum_{i=n-N+1}^{N} D(i) - 6 * R(n) \quad (1)$$

where D(i) is the gyroscope data (204), R(n) is the RPM, is the sample index, N is a positive integer, and i is the summation index. In some implementation, the gyroscope bias is determined by estimating the RPM measurement from a magnetic tool-face measurement. Since the gyroscope bias drifts slowly, an averaging on b'(n) over P samples may be applied to obtain:

$$\hat{b}(n) = \frac{1}{P} \sum_{i=n-P+1}^{P} b'(i) \quad (2)$$

where b' (i) is the estimated gyroscope bias, $\hat{b}(n)$ is the gyroscope bias averaged over P samples, i is the summation index, and P is a positive integer.

At block 205, the estimated bias (e.g., $\hat{b}(n)$) is then subtracted from the gyroscope output (e.g., D(n)). The bias corrected gyroscope output is expressed as follows:

$$D'(n) = D(n) - \hat{b}(n). \quad (3)$$

At block 206, the instantaneous gyro-based angular displacement, $\Delta\theta_{gyro}$, is computed using the bias corrected gyroscope data (e.g., D'(n)) as:

$$\Delta\theta_{gyro} = \frac{D'(n)}{f_s}. \quad (4)$$

For a relatively constant gyroscope bias, this dynamic bias estimation step (e.g., 203) may be excluded. At block 207, the tool-face is computed using the RPM data. Using the estimated RPM, the RPM-based angular displacement, $\Delta\theta_{RPM}(n)$, is computed as:

$$\Delta\theta_{RPM}(n) = R(n) * \frac{6}{f_s}. \quad (5)$$

Tool-face, $\theta_{RPM}(n)$, computed using RPM information is subsequently obtained as:

$$\theta_{RPM}(n) = \hat{\theta}(n-1) + \Delta\theta_{RPM}(n) \quad (6)$$

where $\hat{\theta}(n)$ is the estimated gravitational tool-face.

At block 208, the tool-face, $\theta_{conv}(n)$, is computed using the accelerometer data. The TF is computed using the ATAN function as:

$$\theta_{conv}(n) = a\tan(G_y(n), -G_x(n)). \quad (7)$$

In some aspects, Gx, Gy and Gz are the data from, respectively, X, Y, and Z-axis accelerometers. The X, Y and Z axis data (e.g., Gx(n), Gy(n) and Gz(n)) is obtained from a tri-axial accelerometer at block 209.

At block 210, the gravitational tool-face is computed using the fusion algorithm. The gravitational tool-face measurements may be used to determine depth, location, and direction of a bottom hole assembly in a formation. An operator may use this information to change direction of the bottom hole assembly in a directional drilling operation, as seen in FIG. 1C. In some implementations, the fusion algorithm may be expressed as pseudo code shown below:

Pseudo Code:
θ1—upper threshold for $G_{tot}$
δ2—lower threshold $G_{tot}$
δ3—threshold for $\Delta\theta_{gyro}(n) - \Delta\theta_{conv}(n)$
ΔR—RPM threshold
XcrossInd—latest zero crossing index for $B_x(n)$
YcrossInd—latest zero crossing index for $B_y(n)$
α—complementary filter coefficient
DPMS=6*RPM/$f_s$
$\theta_{mag}=0$
$\theta_{gyro}(n) = \hat{\theta}(n-1) + \Delta\theta_{gyro}(n)$
$\Delta\theta_{conv}(n) = |\theta_{conv}(n)| - |\hat{\theta}(n-1)|$
Step 1: If |R(n)−R(n−1)|>0.3*DPMS Then trFlag=1 Else trFlag=0.
Step 2: Compute $G_{tot}(n) = \sqrt{G_x(n)^2 + G_y(n)^2 + \overline{G_z}(n)^2}$, where $\overline{G_z}(n)$ is the mean of $G_z(n)$.
Step 3: If RPM is not estimated yet, Step 4, else Step 5.
Step 4: If ($|\Delta\theta_{gyro}(n)|>0$) Then
{
$\hat{\theta}(n) = \theta_{gyro}(n)$
If ($G_{tot}(n)$, $G_{tot}(n-1)$, $G_{tot}(n-2) \leq \delta 1$ AND $G_{tot}(n)$, $G_{tot}(n-1)$, $G_{tot}(n-2) \geq \delta 2$ AND $|\Delta\theta_{gyro}(n) - \Delta\theta_{conv}(n)| < \delta 3$)
Then $\hat{\theta}(n) = \alpha\theta_{gyro}(n) + (1-\alpha)\theta_{conv}(n)$
}
Else $\hat{\theta}(n) = \theta_{conv}(n)$.
Go to Step 11.
Step 5: If (trFlag==1) Then Step 6 Else Step 7.
Step 6: If ($G_{tot}(n)$, $G_{tot}(n-1)$, $G_{tot}(n-2) \leq \delta 1$ AND $G_{tot}(n)$, $G_{tot}(n-1)$, $G_{tot}(n-2) \geq \delta 2$ AND $|\Delta\theta_{gyro}(n) - \Delta\theta_{conv}(n)| < 1$)
Then $\hat{\theta}(n) = \theta_{conv}(n)$ Else $\hat{\theta}(n) = \theta_{gyro}(n)$.
Go to Step 10
Step 7: $\hat{\theta}(n) = \theta_{gyro}(n)$
If ($|\Delta\theta_{gyro}(n) - \Delta\theta_{conv}(n)| < \delta 3$ OR $|\theta_{gyro}(n) - \theta_{RPM}(n)| < 0.5$)
Then Step 8 Else Step 9.
Step 8: If ($G_{tot}(n)$, $G_{tot}(n-1)$, $G_{tot}(n-2) \leq \delta 1$ AND $G_{tot}(n)$, $G_{tot}(n-1)$, $G_{tot}(n-2) \geq \delta 2$ AND $|\Delta\theta_{gyro}(n) - \Delta\theta_{conv}(n)| < \delta 3$)
Then $\hat{\theta}(n) = \alpha\theta_{gyro}(n) + (1-\alpha)\theta_{conv}(n)$
Else If ($|\theta_{gyro}(n) - \theta_{RPM}(n)| < |\Delta\theta_{gyro}(n) - \Delta\theta_{conv}(n)|$ AND RPM−RPM(n)<ΔR) Then $\hat{\theta}(n) = 0.5*(n)[\theta_{gyro}(n) + \theta_{RPM}(n)]$
Go to Step 10.
Step 9: $\hat{\theta}(n) = \alpha\theta_{gyro}(n) + (1-\alpha)\theta_{RPM}(n)$. Go to Step 10.
Step 10: If $B_x(n)$ zero crossing detected Then $$\theta_{mag} = \theta_{mag} + 6*R(n) * \frac{XcrossInd - YcrossInd}{f_s}$$

$\hat{\theta}(n) = \theta_{mag}$.
If $B_y(n)$ zero crossing detected Then $$\theta_{mag} = \theta_{mag} + 6*R(n) * \frac{YcrossInd - XcrossInd}{f_s}$$

$\hat{\theta}(n) = \theta_{mag}$.

Step 11: Return θ̂(n). Next.

In one or more examples, step 10 computes TF $\theta_{mag}$ based on zero crossing. At each zero crossing, $\theta_{mag}$ is assigned to θ̂(n) in order to prevent the accumulation and propagation of TF estimation error.

Some simulation results are also shown (e.g., FIGS. 3A, 3B, 4A, 4B, 5A, 5B, 6A, 6B, 7A, 7B) in order to show the performance of the subject technology. The accelerometer data were simulated for a tri-axial accelerometer located exactly at the axis of rotation (zero offset).

Figure 3A:
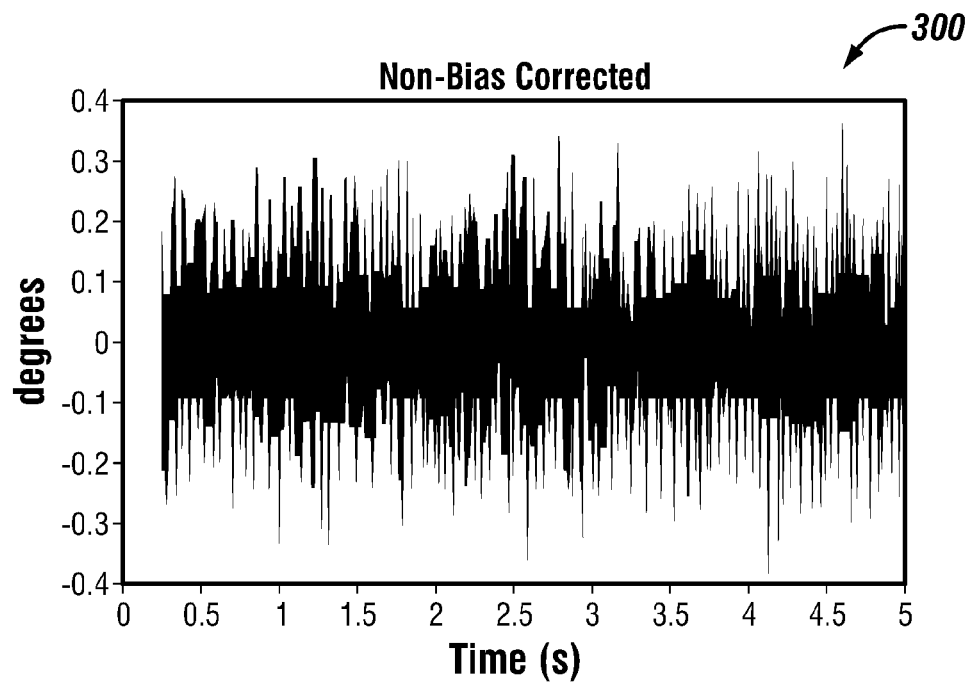
FIGS. 3A and 3B illustrate plots depicting the TF estimation error for the non-bias compensated algorithm and bias compensated algorithm with relatively clean data.
Figure 3B:
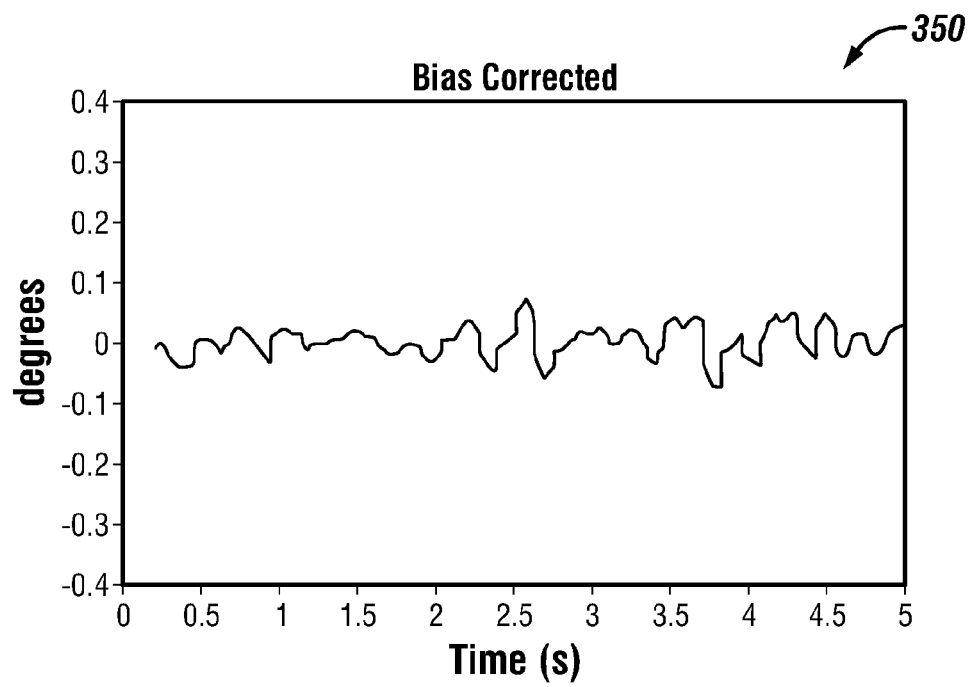

FIGS. 3A and 3B show the TF estimation error for the non-bias compensated (or corrected) algorithm 300 and bias compensated algorithm 350 with relatively clean data with only sensor noise while RPM=250. It may be seen from FIG. 3B that the bias compensated algorithm 350 with an RMS error $E_{rms}$=0.03° outperforms the non-bias compensated algorithm, which achieve $E_{rms}$=0.32°.

Figure 4A:
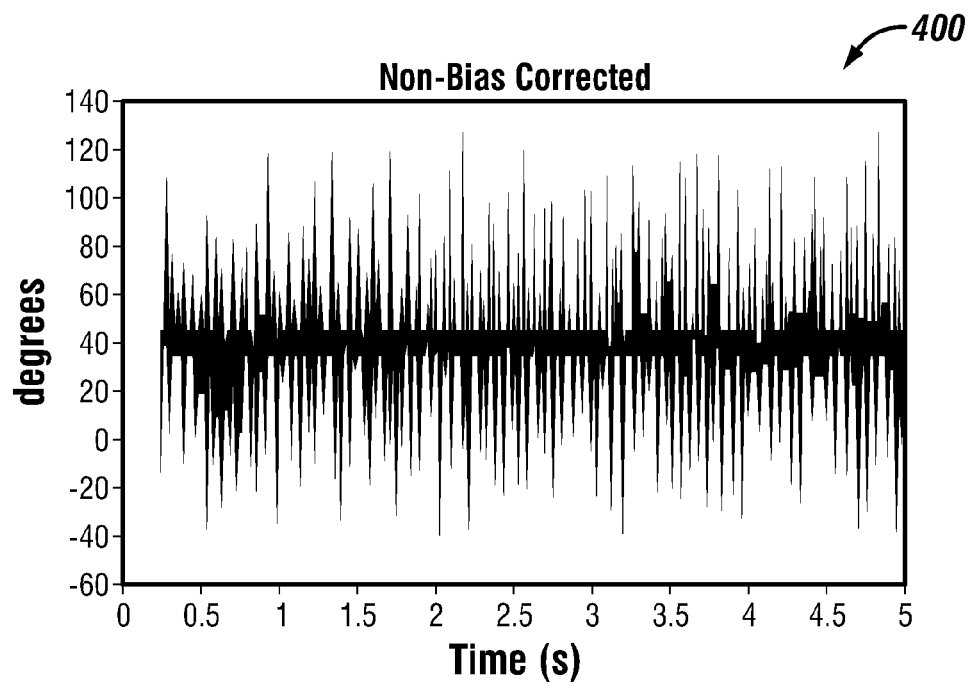
FIGS. 4A and 4B illustrate plots depicting the TF estimation error for the non-bias compensated algorithm and bias compensated algorithm with vibrational data.
Figure 4B:
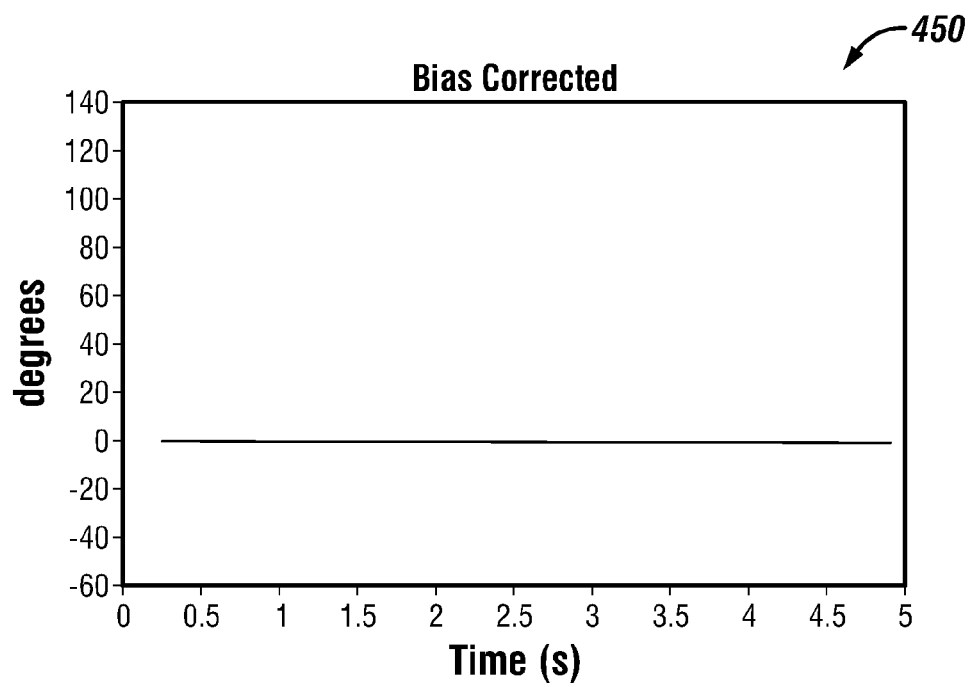

FIGS. 4A and 4B show the TF estimation error for the non-bias compensated (or corrected) algorithm 400 and bias compensated algorithm 450 with data perturbed with vibration noise corresponding to 5 $g_{rms}$. In the presence of noise, performance of the non-bias compensated algorithm 400 deteriorates significantly as can be seen from FIG. 4A, where RMS error is 100.2°. On the other hand, the bias compensated algorithm 450 exhibits better performance with an RMS error of 0.02°.

Figure 5A:
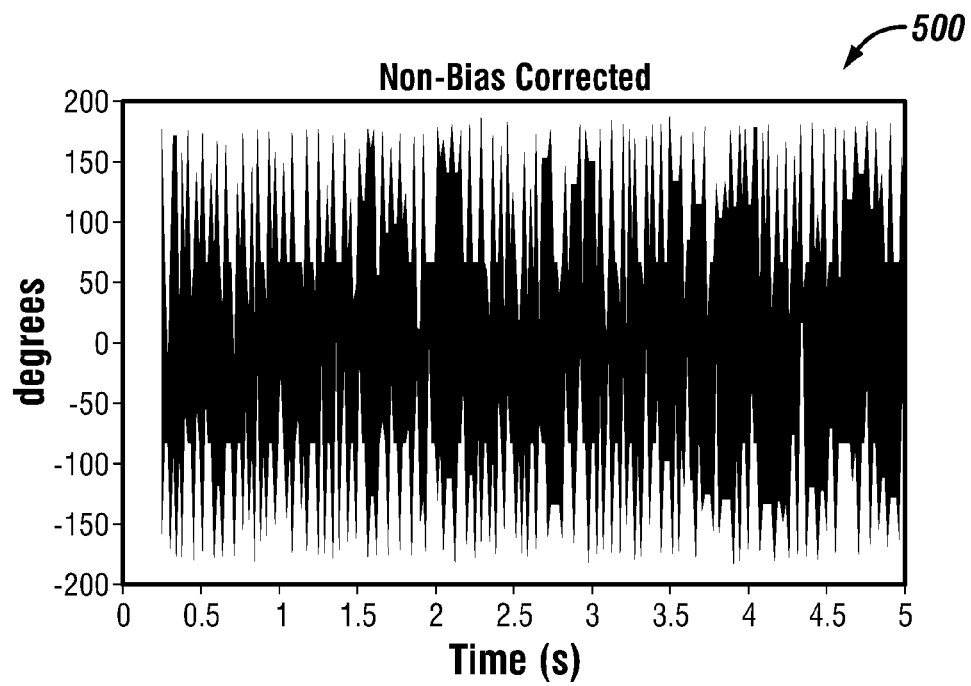
FIGS. 5A and 5B illustrate plots depicting the TF estimation error for the non-bias compensated algorithm and bias compensated algorithm with torsional effect.
Figure 5B:
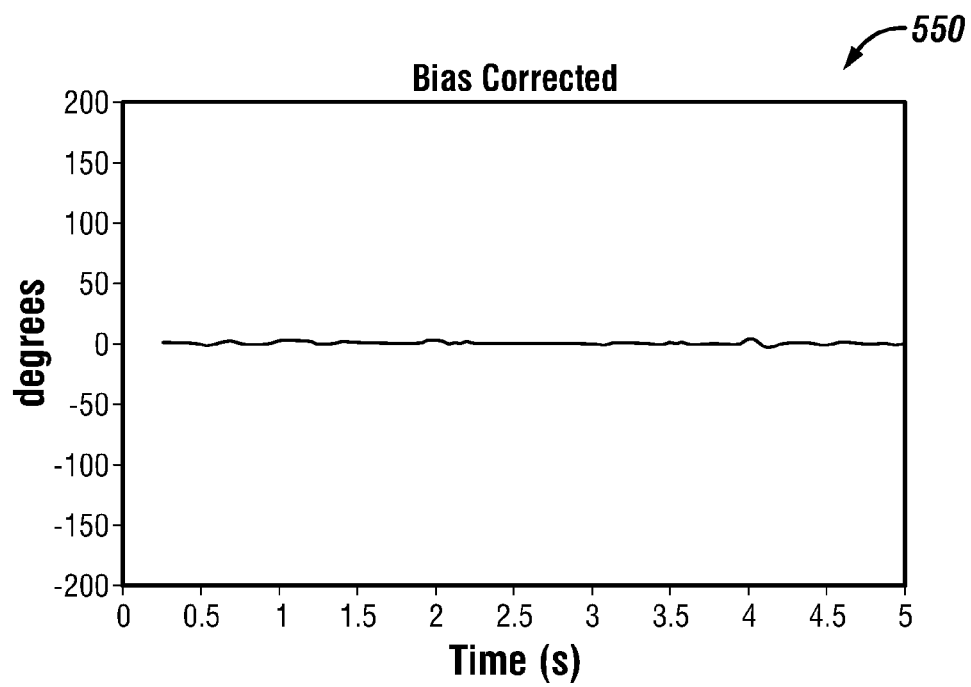

FIGS. 5A and 5B show the TF estimation error for the non-bias compensated (or corrected) algorithm 500 and bias compensated algorithm 550, where the bias compensated algorithm 550 achieves better performance even in the presence of moderate level of torsional effect. While the bias compensated algorithm 550 estimates the TF with $E_{rms}$=0.97°, the non-bias compensated algorithm 500 results in an RMS error of 102.1°. In order to examine the robustness of the bias compensated algorithm 450 against torsional effect, data were generated with 20% torsional resonance.

Figure 6A:
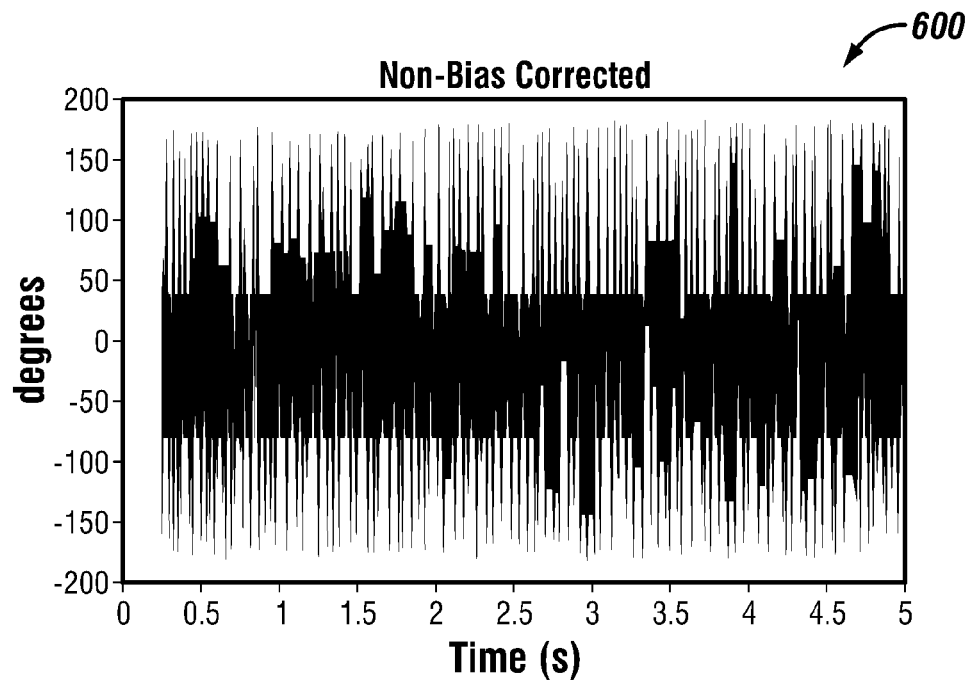
FIGS. 6A and 6B illustrate plots depicting the TF estimation error for the non-bias compensated algorithm and bias compensated algorithm with vibrational and torsional noise.
Figure 6B:
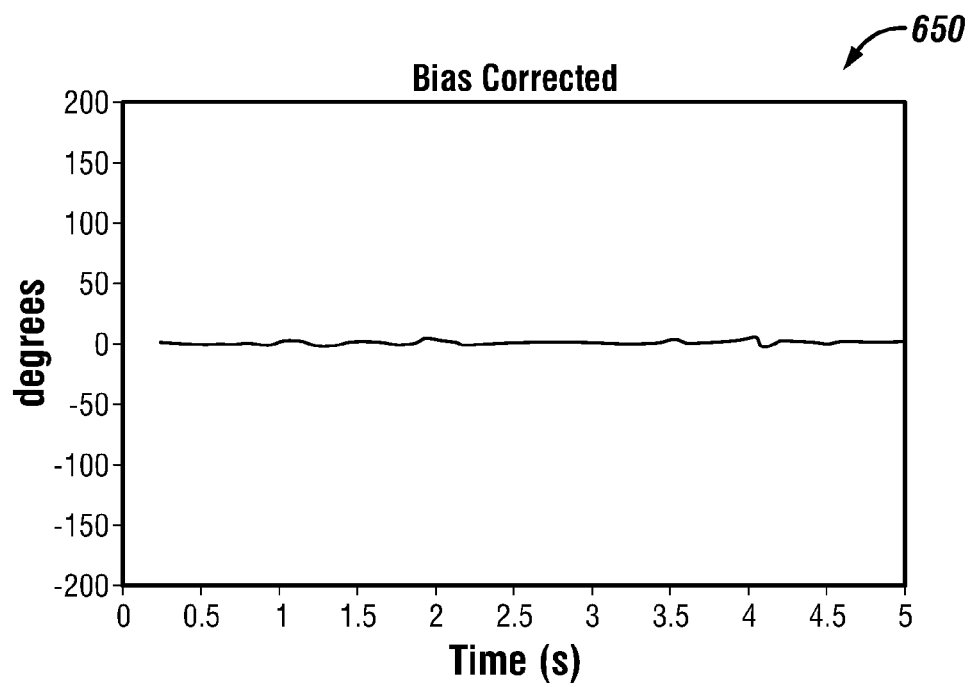

To further elaborate, results obtained with data contaminated with both vibrational as well as torsional noise are shown in FIGS. 6A and 6B. FIGS. 6A and 6B show the TF estimation error for the non-bias compensated (or corrected) algorithm 600 and bias compensated algorithm 650 with vibrational and torsional noise. In this case, the bias compensated algorithm 650 displays, as expected, better performance with $E_{rms}$=0.97°, where the non-bias compensated algorithm 600 exhibits an RMS error of about 103°.

In the foregoing simulations, the accelerometers were assumed to be at the tool axis with zero offset. This assumption may not be true in practical scenarios. Typically, accelerometers are located at an offset from the tool axis. Due to this offset, while rotating, the X and Y accelerometers also experience acceleration resulting from rotational motion. This further deteriorates performance of the non-bias compensated algorithm.

Figure 7A:
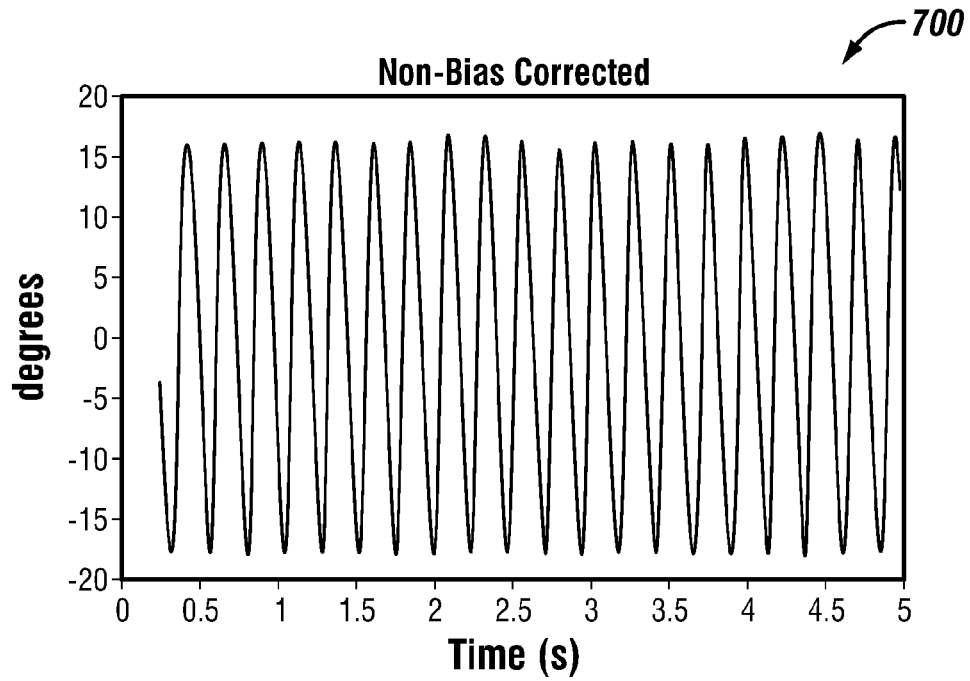
FIGS. 7A and 7B illustrate plots depicting the TF estimation error for the non-bias compensated algorithm and bias compensated algorithm with a radial offset.
Figure 7B:
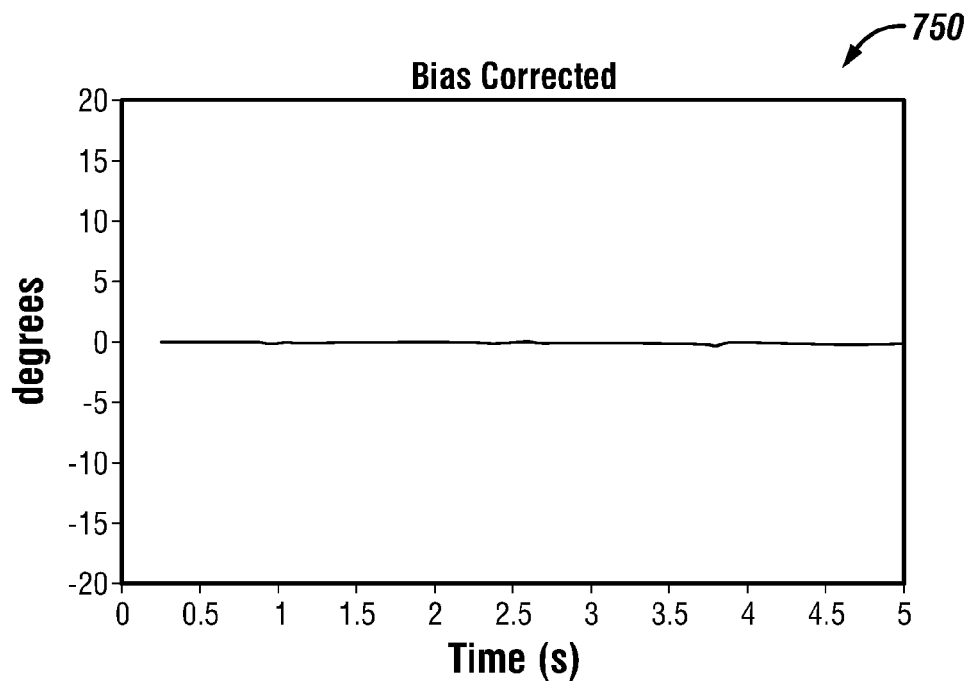

FIGS. 7A and 7B show the TF estimation error for the non-bias compensated (or corrected) algorithm 700 and bias compensated algorithm 750 with a radial offset. Simulation results presented in FIGS. 7A and 7B show the effect of the offset in the estimation performance. The results were generated with clean data simulated corresponding to accelerometers located about 3 millimeters (mm) radially away from the axis of rotation. In this simulation, since the RPM is constant, only the centripetal acceleration component is significant. With this configuration, the non-bias compensated algorithm 700 gives an $E_{rms}$=12.2°. On the contrary, the bias compensated algorithm still achieves better performance resulting in $E_{rms}$=0.02°.

Figure 8:
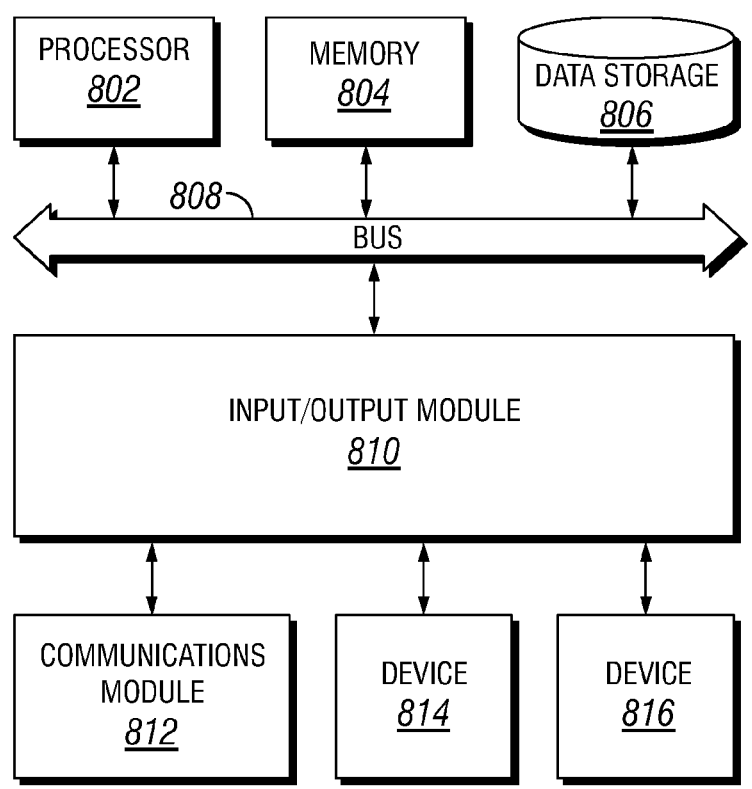
FIG. 8 is a block diagram illustrating an exemplary computer system with which the computing subsystem of FIGS. 1A-1C may be implemented.

FIG. 8 is a block diagram illustrating an exemplary computer system 800 with which computing subsystem 110 of FIGS. 1A-1C may be implemented. In certain aspects, the computer system 800 may be implemented using hardware or a combination of software and hardware, either in a dedicated server, integrated into another entity, or distributed across multiple entities.

Computer system 800 (e.g., computing subsystem 110) includes a bus 808 or other communication mechanism for communicating information, and a processor 802 coupled with bus 808 for processing information. By way of example, computer system 800 may be implemented with one or more processors 802. Processor 802 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that may perform calculations or other manipulations of information.

Computer system 800 may include, in addition to hardware, code that creates an execution environment for the computer program in question, e.g., code that constitutes processor firmware, a protocol stack, a database management system, an operating system, or a combination of one or more of them stored in an included memory 804, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 808 for storing information and instructions to be executed by processor 802. Processor 802 and the memory 804 may be supplemented by, or incorporated in, special purpose logic circuitry.

The instructions may be stored in memory 804 and implemented in one or more computer program products, i.e., one or more modules of computer program instructions encoded on a computer readable medium for execution by, or to control the operation of, computer system 800, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 804 may also be used for storing temporary variable or other intermediate information during execution of instructions to be executed by processor 802.

A computer program as discussed herein does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program may be deployed to be executed on one computer or on multiple computers that are located at one site or distributed across multiple sites and interconnected by a communication network. The processes and logic flows described in this specification may be performed by one or more programmable processors executing one or more computer programs to perform functions by operating on input data and generating output.

Computer system 800 further includes a data storage device 806 such as a magnetic disk or optical disk, coupled to bus 808 for storing information and instructions. Computer system 800 may be coupled via input/output module 810 to various devices. The input/output module 810 can be any input/output module. Exemplary input/output modules 810 include data ports such as USB ports. The input/output module 810 may be configured to connect to a communications module 812. Exemplary communications modules 812 include networking interface cards, such as Ethernet cards and modems. In certain aspects, the input/output module 810 may be configured to connect to a plurality of devices, such as an input device 814 and/or an output device 816. Exemplary input devices 814 include a keyboard and a pointing device, e.g., a mouse or a trackball, by which a user can provide input to computer system 800. Other kinds of input devices 814 may be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 816 include display devices such as a LCD (liquid crystal display) monitor, for displaying information to the user.

According to one aspect of the present disclosure, computing subsystem 110 may be implemented using a computer system 800 in response to processor 802 executing one or more sequences of one or more instructions contained in memory 804. Such instructions may be read into memory 804 from another machine-readable medium, such as data storage device 806. Execution of the sequences of instructions contained in main memory 804 causes processor 802 to perform the process steps described herein. One or more processors in a multi-processing arrangement may also be employed to execute the sequences of instructions contained in memory 804. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification may be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system may be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 800 can include clients and servers. A client and server are generally remote from each other and typically interact through a communication network. The relationship of client and server arises by virtue of computer programs running on the respective computers and having a client-server relationship to each other. Computer system 800 may be, for example, and without limitation, a desktop computer, laptop computer, or tablet computer. Computer system 800 may also be embedded in another device, for example, and without limitation, a mobile telephone such as a smartphone.

The term "machine-readable storage medium" or "computer readable medium" as used herein refers to any medium or media that participates in providing instructions to processor 802 for execution. Such a medium may take many forms, including, but not limited to, non-volatile media, volatile media, and transmission media. Non-volatile media include, for example, optical or magnetic disks, such as data storage device 806. Volatile media include dynamic memory, such as memory 804. Transmission media include coaxial cables, copper wire, and fiber optics, including the wires that comprise bus 808. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

This method and system may include any of the various features of the compositions, methods, and system disclosed herein, including one or more of the following statements.

Statement 1. A method may comprise penetrating a subterranean formation with a bottom hole assembly, wherein the bottom hole assembly comprises a drill bit; determining a revolutions-per-minute (RPM) measurement based on a zero crossing of sinusoidal magnetometer data; determining a gyroscope bias from gyroscope data using the determined RPM measurement; determining bias compensated gyroscope data by subtracting the determined gyroscope bias from the gyroscope data; determining an angular displacement measurement using the bias compensated gyroscope data; computing a first tool-face measurement using the determined RPM measurement; computing a second tool-face measurement using accelerometer data; determining a selected tool-face measurement based on a selection between the first tool-face measurement and the second tool-face measurement using a predetermined selection criterion; computing a weighted sum of the selected tool-face measurement with the determined bias compensated gyroscope data; and determining a gravitational tool-face measurement from the computed weighted sum.

Statement 2. The method of statement 1, wherein the gyroscope bias is determined from N gyroscope data samples of the gyroscope data, where N is a positive integer.

Statement 3. The method of statements 1 or 2, wherein the gyroscope bias, b' (n), is found with $$b'(n) = \frac{1}{N} \sum_{i=n-N+1}^{N} D(i) - 6 * R(n),$$

wherein D(n) is the gyroscope data, R(n) is the RPM, and $f_s$ is sampling rate.

Statement 4. The method of statement 3, further comprising averaging the gyroscope bias.

Statement 5. The method of statements 1 to 3, wherein the angular displacement measurement is determined by computing an integral operation on a previous calculated bias compensated gyroscope data.

Statement 6. The method of statements 1 to 3 or 5, wherein the gyroscope bias is determined by estimating the RPM measurement from a magnetic tool-face measurement.

Statement 7. The method of statements 1 to 3, 5, or 6, wherein the angular displacement measurement is found with $$\Delta\theta_{gyro} = \frac{D'(n)}{f_s},$$

where D(n) is me gyroscope data and $f_s$ is sampling rate.

Statement 8. The method of statements 1 to 3 or 5 to 7, wherein the first tool-face measurement using the determined RPM measurement is found with $$\Delta\theta_{RPM}(n) = R(n) * \frac{6}{f_s},$$

where D(n) is the gyroscope data and $f_s$ is sampling rate.

Statement 9. The method of statements 1 to 3 or 5 to 8, wherein the second tool-face measurement, $\theta_{conv}(n)$, using accelerometer data is found with $\theta_{conv}(n)=a \tan(G_y(n), -G_x(n))$, where $G_x$ and $G_y$ are data from, respectively, X, Y, and Z-axis accelerometers.

Statement 10. The method of statements 1 to 3 or 5 to 9, further comprising altering a path of the bottom hole assembly based at least in part on the gravitational tool-face measurement.

Statement 11. A system may comprise a drilling rig; a pipe string attached to the drilling rig; a bottom hole assembly attached to the pipe string, wherein the bottom hole assembly comprises at least one sensor; a drill bit, wherein the at least one sensor measure a revolutions-per-minute (RPM) of the drill bit; and a computing subsystem connected to the at least one sensor and configured to: determine a revolutions-per-minute (RPM) measurement based on a zero crossing of sinusoidal magnetometer data; determine a gyroscope bias from gyroscope data using the determined RPM measurement; determine bias compensated gyroscope data by subtracting the determined gyroscope bias from the gyroscope data; determine an angular displacement measurement using the bias compensated gyroscope data; compute a first tool-face measurement using the determined RPM measurement; compute a second tool-face measurement using accelerometer data; determine a selected tool-face measurement based on a selection between the first tool-face measurement and the second tool-face measurement using a predetermined selection criterion; compute a weighted sum of the selected tool-face measurement with the determined bias compensated gyroscope data; and determine a gravitational tool-face measurement from the computed weighted sum.

Statement 12. The system of statement 11, wherein the at least one sensor is an accelerometer.

Statement 13. The system of statements 11 or 12, wherein the computing subsystem is further configured to alter a path of the bottom hole assembly.

Statement 14. The system of statements 11 to 13, wherein the computing subsystem is further configured to determine the gyroscope bias from N gyroscope data samples of the gyroscope data, where N is a positive integer.

Statement 15. The system of statement 14, wherein the computing subsystem is further configured to compute the gyroscope bias with $$b'(n) = \frac{1}{N} \sum_{i=n-N+1}^{N} D(i) - 6 * R(n),$$

wherein D(n) is the gyroscope data, R(n) is the RPM, and $f_s$ is sampling rate.

Statement 16. The system of statements 11 to 14, wherein the computing subsystem is further configured to compute the angular displacement measurement with an integral operation on a previous calculated bias compensated gyroscope data.

Statement 17. The system of statements 11 to 14 or 16, wherein the computing subsystem is further configured to determine the gyroscope bias by estimating the RPM measurement from a magnetic tool-face measurement.

Statement 18. The system of statements 11 to 14, 16, or 17, wherein the computing subsystem is further configured to compute the angular displacement with $$\Delta\theta_{gyro} = \frac{D'(n)}{f_s},$$

where D' (n) is the gyroscope data and $f_s$ is sampling rate.

Statement 19. The system of statements 11 to 14 or 16 to 18, wherein the computing subsystem is further configured to compute the determined RPM measurement with $$\Delta\theta_{RPM}(n) = R(n) * \frac{6}{f_s},$$

where D(n) is the gyroscope data and $f_s$ is sampling rate.

Statement 20. The system of statements 11 to 14 or 16 to 19, wherein the computing subsystem is further configured to compute the second tool-face measurement using accelerometer data with $\theta_{conv}(n)=a \tan(G_y(n), -G_x(n))$, where $G_x$, $G_y$, and $G_z$ are data from, respectively, X, Y, and Z-axis accelerometers.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the subject technology. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

Therefore, the subject technology is well adapted to attain the ends and advantages mentioned as well as those that are inherent therein. The particular embodiments disclosed above are illustrative only, as the subject technology may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the subject technology. The subject technology illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is:

1. A method, comprising:
penetrating a subterranean formation with a bottom hole assembly, wherein the bottom hole assembly comprises a drill bit;
determining a revolutions-per-minute (RPM) measurement based on a zero crossing of sinusoidal magnetometer data;
determining a gyroscope bias from gyroscope data using the determined RPM measurement;
determining bias compensated gyroscope data by subtracting the determined gyroscope bias from the gyroscope data;
determining a gyro-based angular displacement measurement using the bias compensated gyroscope data;
computing a first tool-face measurement using the determined RPM measurement;
computing a second tool-face measurement using accelerometer data;
determining a selected tool-face measurement based on a selection between the first tool-face measurement and the second tool-face measurement using a predetermined selection criterion;
computing a weighted sum of the selected tool-face measurement and a gyro-based tool-face measurement;
determining a gravitational tool-face measurement from the computed weighted sum; and
further comprising altering a path of the bottom hole assembly based at least in part on the gravitational tool-face measurement.

2. The method of claim 1, wherein the gyroscope bias is determined from N gyroscope data samples of the gyroscope data, where N is a positive integer.

3. The method of claim 2, wherein the gyroscope bias, $b'(n)$, is found with $$b'(n) = \frac{1}{N} \sum_{i=n-N+1}^{N} D(i) - 6 * R(n),$$

wherein $D(i)$ is the gyroscope data, $R(n)$ is the RPM, n is a sample index, N is the positive integer, and i is a summation index.

4. The method of claim 3, further comprising averaging the gyroscope bias.

5. The method of claim 1, wherein the angular displacement measurement is determined by computing an integral operation on a previous calculated bias compensated gyroscope data.

6. The method of claim 1, wherein the gyroscope bias is determined by estimating the RPM measurement from a magnetic tool-face measurement.

7. The method of claim 1, wherein the gyro-based angular displacement measurement, $\Delta\theta_{gyro}$, is found with $$\Delta\theta_{gyro} = \frac{D'(n)}{f_s},$$

where $D'(n)$ is the bias compensated gyroscope data, $f_s$ is sampling rate, and n a sample index.

8. The method of claim 1, wherein the first tool-face measurement $\theta_{RPM}(n)$, using the determined RPM measurement is found with $\theta_{RPM}(n)=\hat{\theta}(n-1)+\Delta\theta_{RPM}(n)$ where $\hat{\theta}(n)$ is the gravitational tool-face measurement, $$\Delta\theta_{RPM}(n) = R(n) * \frac{6}{f_s},$$

where $R(n)$ is the RPM, $f_s$ is sampling rate, and n is a sample index.

9. The method of claim 1, wherein the second tool-face measurement, $\theta_{conv}(n)$, using accelerometer data is found with $\theta_{conv}(n)=a\tan(G_y(n), -G_x(n))$, where Gx and Gy are data from, respectively, X and Z-axis accelerometers, and n is a sample index.

10. A system, comprising:
a drilling rig;
a pipe string attached to the drilling rig;
a bottom hole assembly attached to the pipe string, wherein the bottom hole assembly comprises at least one sensor;
a drill bit, wherein the at least one sensor measures a revolutions-per-minute (RPM) of the drill bit; and
a computing subsystem connected to the at least one sensor and configured to:
determine a revolutions-per-minute (RPM) measurement based on a zero crossing of sinusoidal magnetometer data;
determine a gyroscope bias from gyroscope data using the determined RPM measurement;
determine bias compensated gyroscope data by subtracting the determined gyroscope bias from the gyroscope data;
determine a gyro-based angular displacement measurement using the bias compensated gyroscope data;
compute a first tool-face measurement using the determined RPM measurement;
compute a second tool-face measurement using accelerometer data;
determine a selected tool-face measurement based on a selection between the first tool-face measurement and the second tool-face measurement using a predetermined selection criterion;
compute a weighted sum of the selected tool-face measurement and the gyro-based tool-face measurement; and
determine a gravitational tool-face measurement from the computed weighted sum.

11. The system of claim 10, wherein the at least one sensor is an accelerometer.

12. The system of claim 10, wherein the computing subsystem is further configured to alter a path of the bottom hole assembly.

13. The system of claim 10, wherein the computing subsystem is further configured to determine the gyroscope bias from N gyroscope data samples of the gyroscope data, where N is a positive integer.

14. The system of claim 13, wherein the computing subsystem is further configured to compute the gyroscope bias, $b'(n)$, with $$b'(n) = \frac{1}{N} \sum_{i=n-N+1}^{N} D(i) - 6 * R(n),$$

wherein $D(i)$ is the gyroscope data, $R(n)$ is the RPM, n is a sample index, N is the positive integer, and i is a summation index.

15. The system of claim 10, wherein the computing subsystem is further configured to compute the angular displacement measurement with an integral operation on a previous calculated bias compensated gyroscope data.

16. The system of claim 10, wherein the computing subsystem is further configured to determine the gyroscope bias by estimating the RPM measurement from a magnetic tool-face measurement.

17. The system of claim 10, wherein the computing subsystem is further configured to compute the gyro-based angular displacement measurement, $\Delta\theta_{gyro}$, with $$\Delta\theta_{gyro} = \frac{D'(n)}{f_s},$$

where $D'(n)$ is the bias compensated gyroscope data, $f_s$ is sampling rate, and n is a sample index.

18. The system of claim 10, wherein the computing subsystem is further configured to compute the first tool-face measurement, $\theta_{RPM}(n)$, using the determined RPM measurement with $\theta_{RPM}(n) = \hat{\theta}(n-1) + \Delta\theta_{RPM}(n)$, where $\hat{\theta}(n)$ is the gravitational tool-face measurement, $$\Delta\theta_{RPM}(n) = R(n) * \frac{6}{f_s},$$

where $R(n)$ is the RPM, $f_s$ is sampling rate, and n is a sample index.

19. The system of claim 10, wherein the computing subsystem is further configured to compute the second tool-face measurement, $\theta_{conv}(n)$, using accelerometer data with $\theta_{conv}(n) = a\tan(G_y(n), -G_x(n))$, where Gx and Gy are data from, respectively, X and Y axis accelerometers, and n is a sample index.

* * * * *